United States Patent [19]

Balmer

[11] Patent Number: 4,475,819
[45] Date of Patent: Oct. 9, 1984

[54] PNEUMATIC GRANULAR OR SEED APPLICATOR

[76] Inventor: Charles Balmer, Box 34, Elie, Manitoba, Canada, R0H 0H0

[21] Appl. No.: 288,675

[22] Filed: Jul. 31, 1981

[30] Foreign Application Priority Data

Mar. 25, 1981 [GB] United Kingdom ............. 8109305

[51] Int. Cl.³ ........................................... B01F 13/02
[52] U.S. Cl. .................................. 366/107; 239/654; 366/101; 366/156; 366/177; 366/191; 406/123; 406/144
[58] Field of Search .............. 366/186, 184, 101, 102, 366/106, 107, 279, 191, 194–196, 154–156, 315, 177, 603; 239/654, 655; 111/11, 34; 406/123, 144; 222/178, 193, 301, 617

[56] References Cited

U.S. PATENT DOCUMENTS

| | | |
|---|---|---|
| 2,521,888 | 9/1950 | Wilson ............................ 239/654 |
| 2,601,534 | 6/1952 | Laffoon . |
| 2,923,574 | 2/1960 | Fuss . |
| 2,976,643 | 3/1961 | Chafer . |
| 3,169,799 | 2/1965 | Puckett . |
| 3,258,296 | 6/1966 | Funk . |
| 3,568,937 | 3/1971 | Grataloup ....................... 239/655 |
| 3,631,825 | 1/1972 | Weiste ............................. 111/11 |
| 3,643,872 | 2/1972 | Smith .............................. 239/655 |
| 3,675,856 | 7/1972 | Kverneland ..................... 239/654 |
| 3,926,377 | 12/1975 | Johnson . |
| 4,024,822 | 5/1977 | Ross . |
| 4,215,824 | 8/1980 | Weiste . |

FOREIGN PATENT DOCUMENTS

| | | |
|---|---|---|
| 78279 | 3/1948 | Czechoslovakia ............... 239/654 |
| 284449 | 8/1913 | Fed. Rep. of Germany . |
| 1564295 | 4/1969 | France . |
| 1569181 | 4/1969 | France . |
| 28060 | of 1913 | United Kingdom . |
| 683531 | 12/1952 | United Kingdom . |
| 873718 | 7/1961 | United Kingdom . |

Primary Examiner—Timothy F. Simone
Attorney, Agent, or Firm—Stanley G. Ade

[57] ABSTRACT

The invention is a pneumatic granular or seed applicator for fertilizer, herbicides or seeds and it includes a vertically situated auger assembly which is connected to the source of the material to be distributed. A distribution casing surrounds the upper discharge end of the auger assembly and blades or vanes are secured to the upper end of the auger shaft to radially distribute the material augered by the auger assembly, outwardly of the distribution casing. Discharge collars are situated around the base of the distribution casing and convey the material to discharge conduits which are conventional and which lead to the normal distribution heads and discharge devices. Air under pressure passes through venturi and assists in picking up the material from the discharge collars and conveys it to the various discharge conduits and thence to the individual ground engaging applicators, which are conventional. The assembly ensures a more even distribution of the material being distributed, and as the speed of rotation of the auger assembly can be controlled within limits, the device is well suited for use with a plurality of different materials.

23 Claims, 11 Drawing Figures

PNEUMATIC GRANULAR OR SEED APPLICATOR

BACKGROUND OF THE INVENTION

This invention relates to new and useful improvements in pneumatic granular applicators, particularly applicators in which granulated material such as fertilizer, herbicides or small seeds is fed into an air stream which then distributes same to the individual ground engaging applicators on the implement.

Conventionally, granulated materials such as fertilizer, herbicides and the like is distributed by feeding same to one or more horizontally rotating spinners situated below or adjacent to the hopper. The efficiency accuracy and evenness of distribution of such devices is effected by prevailing winds, sloping ground conditions, density of the material and more importantly by the size of the particles, particularly when the particle size varies considerably in a single batch of material as is often the case.

SUMMARY OF THE INVENTION

The present invention overcomes these disadvantages by providing a vertically situated auger, the speed of which is controllable within limits, said auger being operatively connected to the hoppper and moving the granular material or seed upwardly to an enclosed rotary fan-like distributor whereupon it may be evenly distributed into the conveying air stream and discharged through the main distribution conduits to the individual applicators.

In accordance with the invention there is provided an applicator for granular materials such as granular fertilizer, herbicides or the like and seeds. It comprises a substantially vertically situated auger assembly which includes an upper discharge end. The auger assembly is operatively connected to a source of power and also to a source of granular material, seed or the like. It includes a distribution casing surrounding the discharge end with the auger assembly for receiving material conveyed by the auger assembly. Means are provided on the upper end of the auger assembly for moving said material towards the outer wall of the distribution casing and a plurality of discharge conduits for conveying the material from the casing through said discharge conduits.

A further advantage of the present invention is to provide a device of the character herewithin described which maintains considerable accuracy of distribution and which is readily adapted for use with various forms of granular material and/or seeds merely by varying the speed of the vertically situated feed auger and the intake of the material from the hopper.

Another advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes description of the preferred typical embodiment of the principles of the present invention, in which:

DESCRIPTION OF THE DRAWINGS

In the drawings like characters of reference indicate corresponding parts in the different figures.

DETAILED DESCRIPTION

Proceeding therefore to describe the invention in detail, reference character 10 illustrates a vertically situated auger tube operative connected to a hopper 38 which may contain the granular material or seed, as the case may be.

Figure 11:
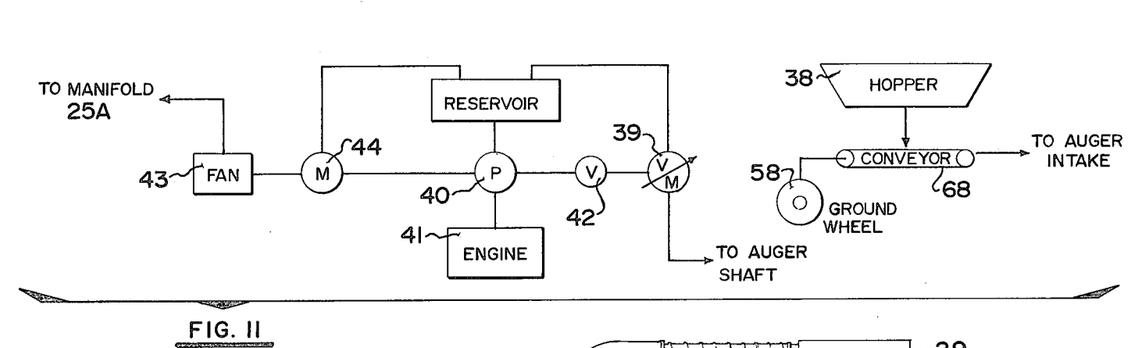
FIG. 11 is a schematic view of the system.

An auger shaft 11 is rotatable therein with an auger flight 12 formed or secured therearound and the shaft is connected to a source of power such as a variable speed orbital motor 39 operated by pump 40 which in turn is connected to a source of power 41. This permits rotation of the auger shaft and flight with the speed of rotation being controllable by conventional means such as valve 42 (see FIG. 11).

An annular casing 13 extends upwardly from adjacent the upper end of the auger, terminating in a horizontal plate 14 secured thereto by means of nut and bolt assemblies 15 or the like, and the upper end 16 of the auger shaft is bearingly supported for rotation within this plate. A plurality of radially extending distributor blades or vanes 17 are secured to the upper end of the auger shaft and below the plate 14 and rotate with the auger and within casing 13 so that the grain or granular material passing upwardly through the auger tube 10, is picked up and distributed radially by the blades 17 in an even manner, outwardly against the vertical sides of the casing 13.

A cone shaped annular collar 18 extends outwardly and downwardly from the upper end 19 of the auger tube portion 10A and in conjunction with the vertical wall 20 of the casing 13, forms a discharge area for the granular material or seeds moved outwardly by the distributor blades 17, annular base plate 19A extending from the outer lower end of the collar 18 to the lower end of the casing wall 20.

It is preferable that the upper end portion 10A of the augar tube, the annular collar 18 and the base plate 18A be formed as a separate unit, being detachably secured to the upper end of the augar tube 10 by means of flanged collars 10B and 10C secured together by nut and bolt assemblies 10D or the equivalent.

A plurality of discharge collars 21 are provided through the base plate 18A around the base 22 of the annular channel defined by the wall 20 and the collar 18 and each of these terminates in a downwardly extending discharge conduit 22 to which a flexible conduit portion 23 is secured as by clamps 24 or the like.

Situated around the outer surface of the vertical wall 20 of the casing 13 is a plurality of air conduits 25 operatively connected to a source of air via manifold 25A, developed by a fan 43 driven by an orbital motor 44 also connected to the source of power 41 (see FIG. 11), said air travelling in the direction of arrows 26. There is one such air conduit 25 for each discahrge conduit 22 and these air conduits 25 each blend into the corresponding discharge conduit 22 in a downwardly extending direction as clearly shown in FIG. 2. The individual air conduits 25 may be formed integrally with the corresponding discharge conduits 22 and be secured in place around the wall 20 by an conventional means such as shet metal screws 18B. A venturi 27 is formed within the air conduits 25 adjacent the junction thereof with the material discharge collars 21 thus speeding up the air flow and lowering the pressure to assist in the extraction of the granular material or seeds from the annular channel surrounding the upper end of the auger tube. The distributor blades 17 rotates at the same rate as the auger shaft and flight and distribute the material evenly to the outside of the casing 13 whereupon it is deposited through the collars 21 and picked up in the air stream to pass downwardly through the distributor conduits 23, carried by the air stream to conventional individual applicators (not illustrated).

Figure 1:
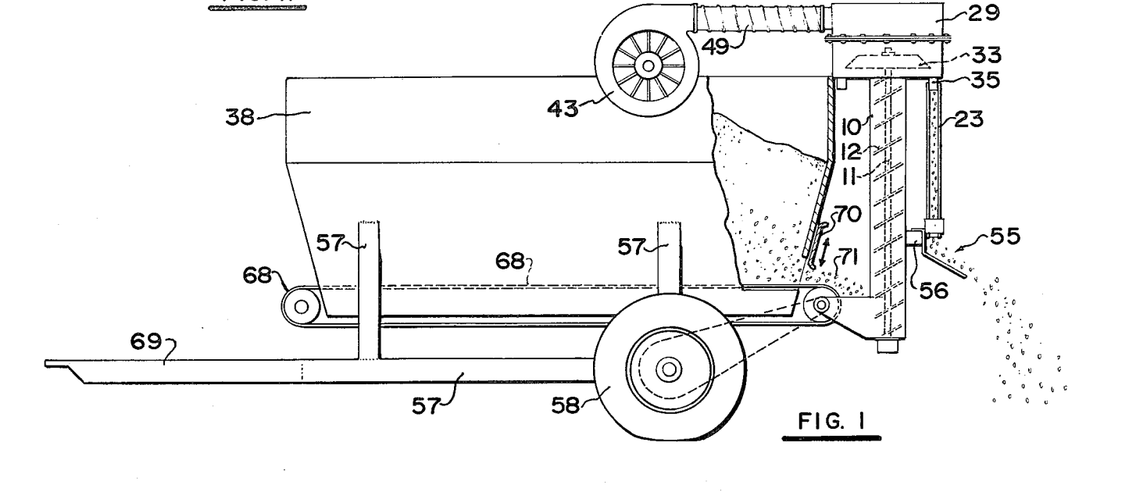
FIG. 1 is a schematic side elevation of the device.
Figure 2:
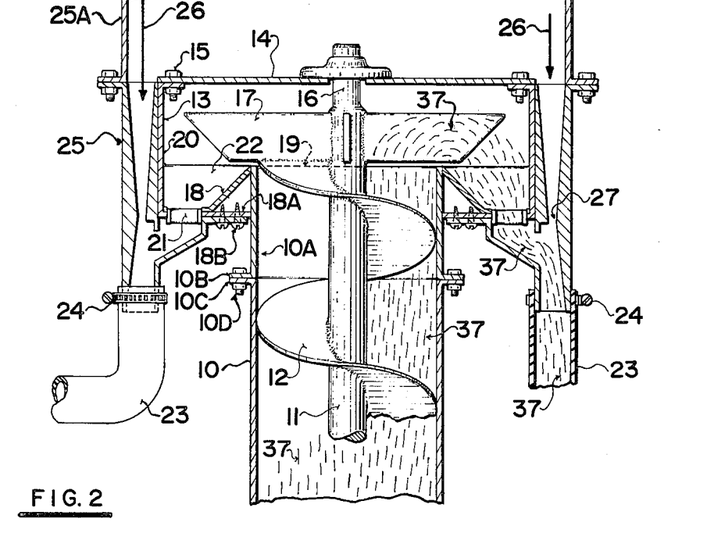
FIG. 2 is a fragmentary partially schematic cross sectional view of the upper end of the auger showing the distribution device of one embodiment of the device.
Figure 3:
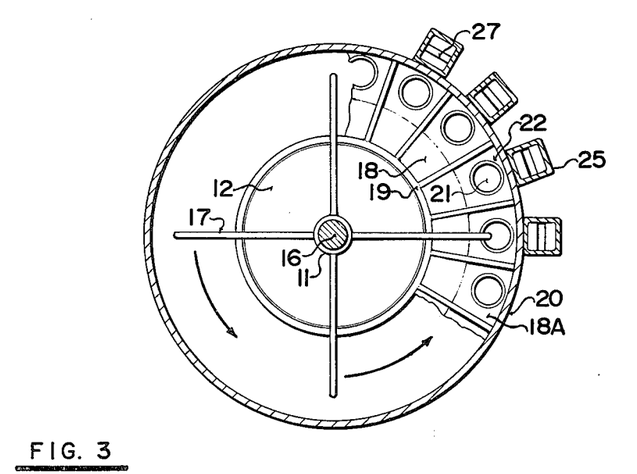
FIG. 3 is a top plan view of FIG. 1.
Figure 4:
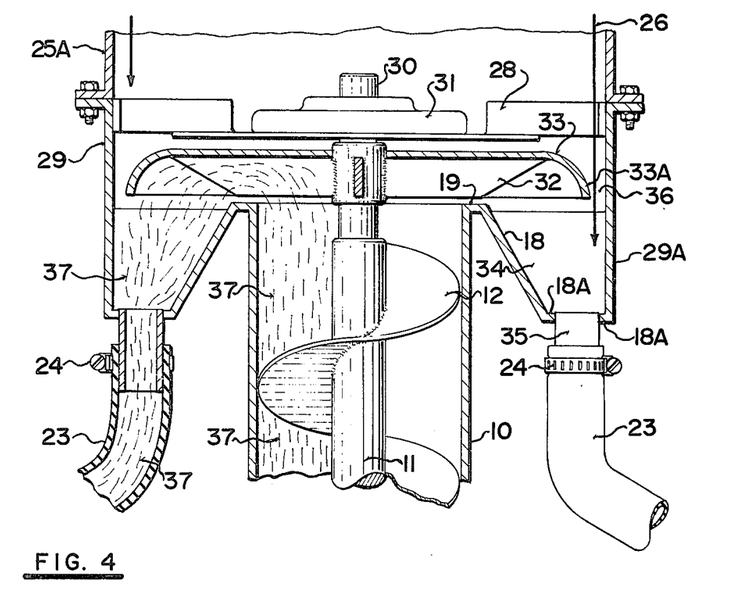
FIG. 4 is a view similar to FIG. 2, but showing an alternative construction.
Figure 5:
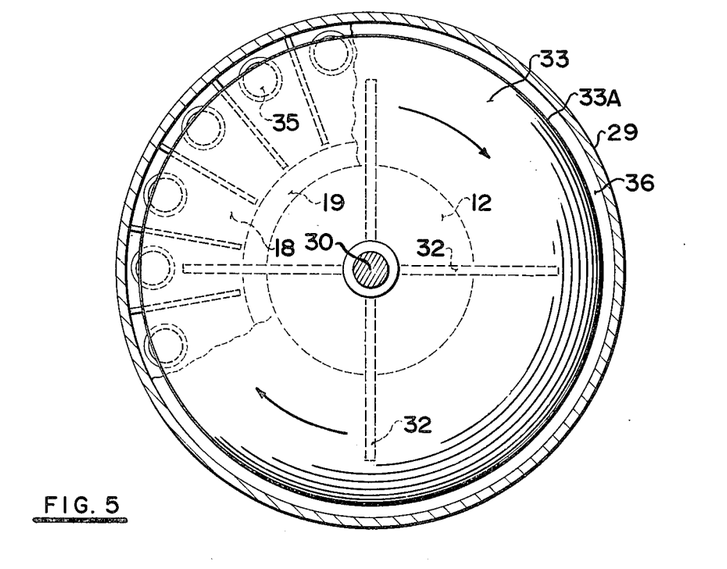
FIG. 5 is a top plan view of FIG. 4.

In the embodiment shown in FIGS. 4 and 5, much of the structure is similar to that shown in FIGS. 1 and 2 so that similar reference characters have been used where applicable. This embodiment includes the upwardly extending auger casing 10, an auger shaft 11 and the auger flight 12 moving the material upwardly through the tube 10 in a manner similar to that hereinbefore described.

A spider assembly 28 spans the upper end of a casing 29 and supports the upper end 30 of the auger shaft 11 within a bearing assembly 31 which is secured to the spider assembly. Distributor blades 32 are secured to the upper end of the shaft below the spider assembly 28, acting in a manner similar to the distributor blades 17 of the previous embodiment, with the exception that an inverted dish-shaped shroud 33 is secured to the upper edges of the distributor blades 32 and rotates therewith. This assists in directing the material augered upwardly by the auger assembly, towards the outside of the casing 29 and directs it downwardly into the annular channel 34 defined by the annular cone shaped collar 18 and the lower annular wall portion 29A, whereupon it passes through discharge collars 35 into flexible distribution conduits 23 secured by clamps 24.

Air enters the upper end of casing 29 (similar to casing 13) from the fan 43 travelling in the direction of arrows 26 and passes between the outer periphery 33A of the dish-shaped shroud 33 and the wall 29 of the casing, downwardly into the annular channel 34 and thence out through the individual discharge collars 35 with the curved inverted periphery 33A of the dish and the vertical wall 29 acting to define a venturi 36 to assist in the picking up and even distribution of the granular material or seeds being distributed radially by the fan blades 32. In both embodiments, the lines 37 indicate direction of flow of the granular material and/or seeds.

Figure 6:
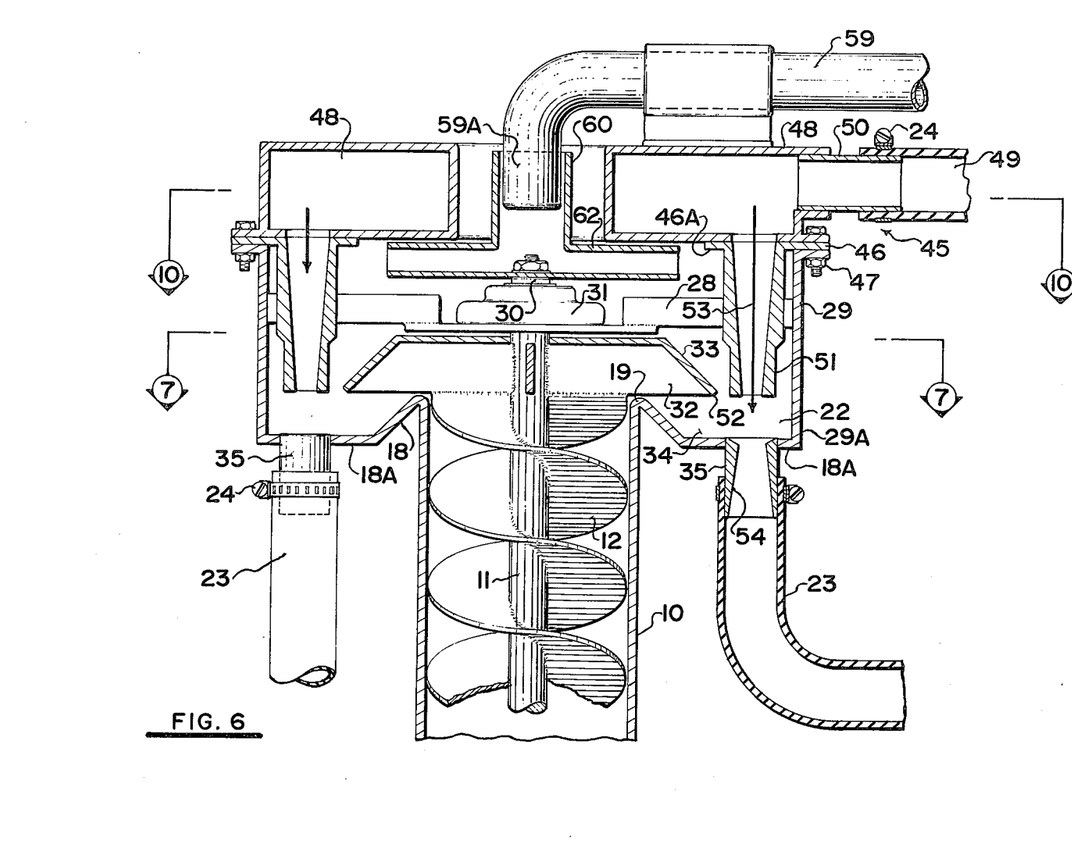
FIG. 6 is a vertical section of the preferred embodiment of the device.
Figure 7:
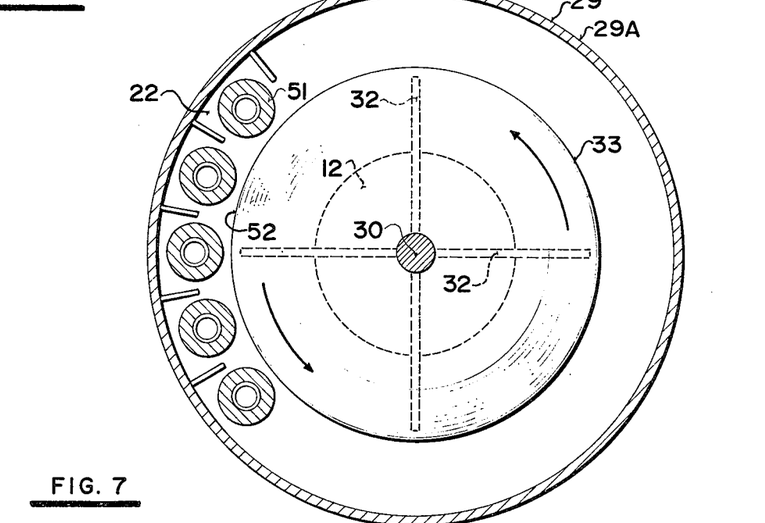
FIG. 7 is a horizontal section substantially along the line of 7—7 of FIG. 6.

FIG. 6 shows the preferred embodiment which includes not only a different positioning for the venturi but also, and alternatively, an additional air and chemical mixture feed assembly.

Where common parts exist relative to the previous embodiment, similar reference characters have been used. It utilizes the auger assembly including the auger tube 10, shaft 11 and auger 12 together with the dish-shaped shroud 33 and the distributing blades 32 situated at the upper end 19 of the auger assembly. The upper end 30 of the auger shaft 11 is supported within bearing 31 which in turn is supported centrally at the spider assembly 28 extending from the distributor casing 29.

In this embodiment, an air-manifold collectively designated 45 is bolted to the upper end flange 46 of the distributor casing 29 by means of nut and bolt assemblies 47 and includes the annular plenum 48 operatively connected to the fan assembly 43 by means of one or more connecting conduits 49 detachably secured to collars 50 extending from and communicating with the plenum 48.

The flange 46 extends inwardly as an annular flange portion 46A and supports a plurality of downwardly extending venturi tubes 51 there being one such venturi tube situated vertically above each discharge collar 35 situated within the base of the distributor casing. Each venturi tube terminates spaced above the discharge collar substantially level with the lower periphery 52 of the rotating shroud 33 of which is clearly shown in FIG. 6.

The venturi 51 speeds up the air stream travelling downwardly from the plenum 48 in the direction of arrows 53 to pick up the granular material from the distributor blades 32 and the shroud 33 and discharges same through the discharge collars 35 into the distributor conduit 33. It will be observed that a reverse Venturi 54 is situated within each discharge collar 35 to decelerate the air and granular material passing therethrough whereupon it flows through the distributor conduits 33 to the individual distributors 55 supported on the booms 56 extending from frame 57, said structure being basically conventional. Details are shown in FIG. 8 and include ground engaging wheels 58 upon which the supporting structure 57 is mounted together with hopper 38.

An additional air and chemical granular mixture may be supplied in conjunction with the granular mixture supplied by the auger assembly 10, 11 and 12. If this is desired, it may be supplied through an upper conduit 59, from a separate hopper and entrained within air from a fan (not illustrated) similar to fan 43. The conduit 59 terminates in a down-turned end portion 59A which freely engages within a vertically situated collar 60. This collar, which has a closed face 61, is secured to the upper end 30 of the auger shaft 11 and rotates therewith. It is situated centrally off the annular manifold 48 and a plurality of pipes or conduits 62 are secured to and communicate with adjacent to the face of the collar 60 and extend horizontally outwardly therefrom towards the vertical wall casing 29. This material moving assembly is situated above the spider 28 and above the distributor blades 32 and shroud 33 and, as it rotates, it distributes granular material in train with air, into the casing 29 where it falls by gravity to mix with the material being fed to the casing 29 by means of the auger assembly. It is then picked up by the air stream and injected through the discharge collars 35 and mixed with the material from the auger assembly.

This permits two types of material to be introduced to the assembly, in varying proportions, and to be mixed together and distributed upon the ground surface.

Figure 8:
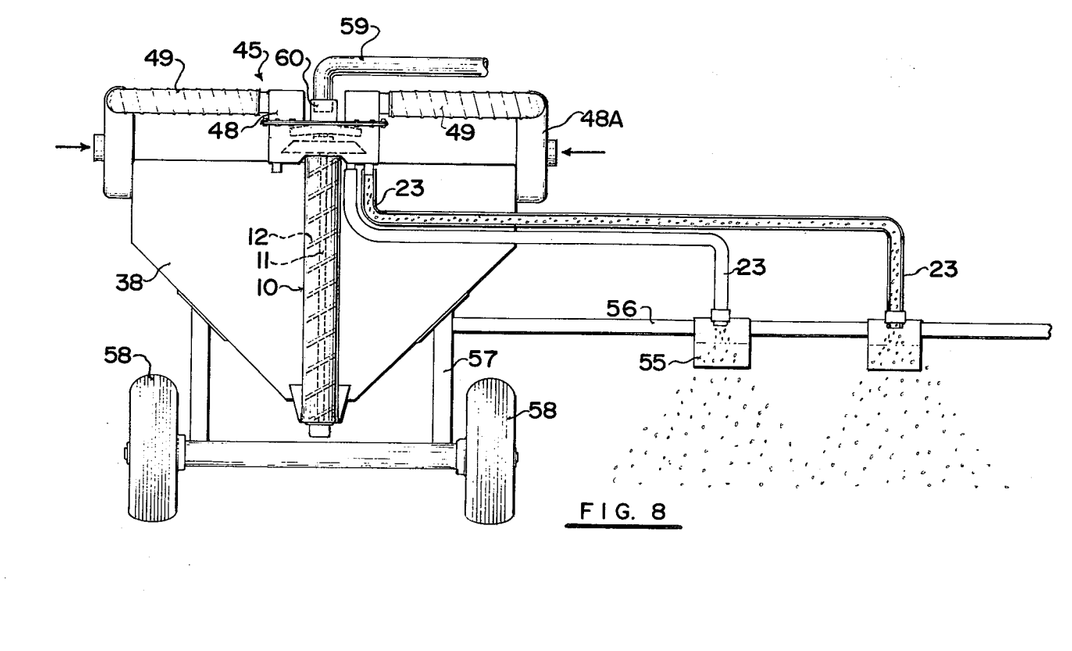
FIG. 8 is a partial schematic rear view, sectioned in part showing the embodiment of FIG. 6 in situ.

This combined structure is shown, in situ, in FIG. 8 which illustrates shcematically a rear view of the device.

Figure 9:
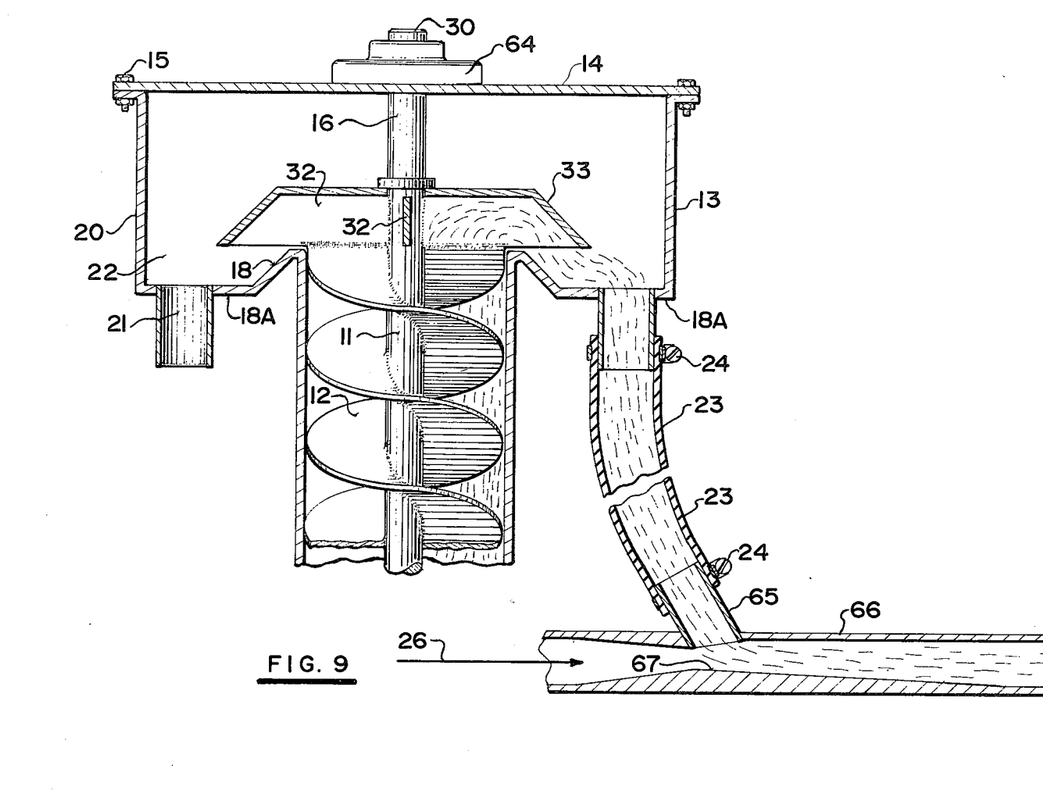
FIG. 9 is a fragmentary vertical section of a further embodiment.
Figure 10:
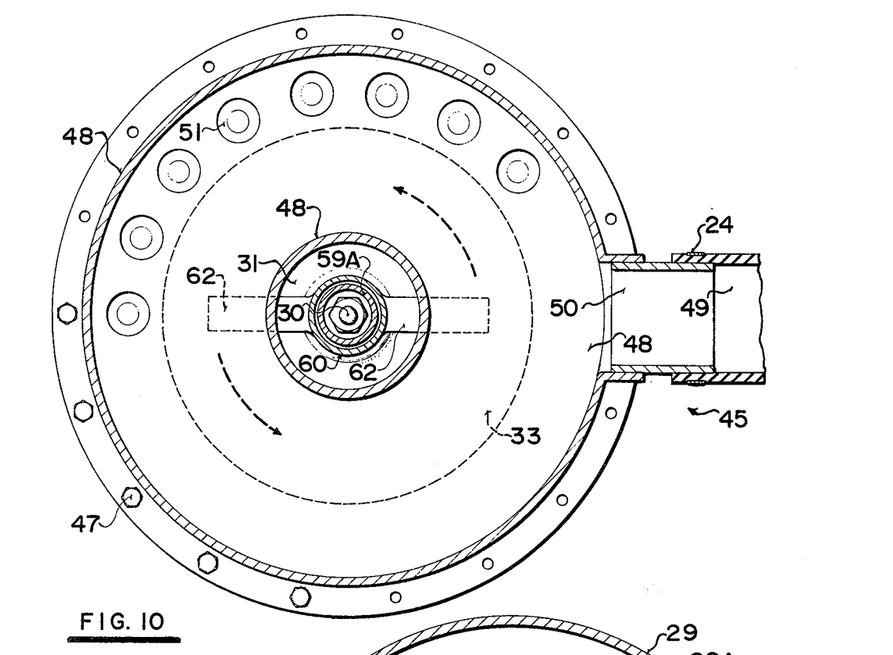
FIG. 10 is a horizontal section along substantially along the line 10—10 of FIG. 6.

An alternative embodiment is shown in FIG. 9 which includes the vertical situated auger assembly 10, 11 and 12 moving granular material upwardly to be distributed outwardly within the distributor casing 13 by means of blades 32 and shroud 33. This embodiment, the upper end 16 of the auger shaft is supported within a bearing 64 situated within the upper horizontal closure panel 14 secured to the upper end of the distributor casing 13.

Each distributor conduit 23 is connected at the distal or lower end thereof, to a collar 65 extending from and communicating with the interior of a horizontal feed conduit 66 operatively connected by the up-stream end thereof to a fan assembly similar to fan 43 and by the down stream thereof to a granular material distributor assembly 55, being understood that each individual discharge conduit 23 is provided with its own feed conduit 66.

The collar 65 leads into the conduit 66 with the axis inclined from the vertical so that it leads in down stream and a venturi section 67 is provided within the conduit 66 adjacent to the connection of the collar 65 with the conduit 66 in order to speed up the air flow at this point thereby creating an area of low pressure within the discharge conduit 23 which facilitates the feeding in of a granular material distributed outwardly by the blades 32.

In all embodiments, the auger shaft 11 is preferably driven hydraulically and includes variable speed means as hereinbefore described.

It is preferable that the hopper 38 includes a discharge conveyor 68 shown schematically in FIG. 1 mounted upon the frame 57 supported by the ground engaging wheels 58. A hitch 69 may connect the device to a source of power such as a tractor or the like (not illustrated).

An adjustable discharge gate 70 is shown schematically in FIG. 1 and controls the ejection of the granular material 71 together with the speed of the feed conveyor 68 which is driven from one of the ground engaging wheels 58 so that the speed is controlled by the speed of the assembly across the ground.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A pneumatic applicator for granular materials, such as granular fertilizer, herbicides or the like and seeds; comprising in combination a substantially vertically situated auger assembly including an upper discharge end, said auger assembly being operatively connected to a source of power and to a source of granular material, seed or the like, a distribution casing surrounding the discharge end of said auger assembly, said distribution casing having a base and an outer wall, a plurality of separation walls rising above said base to define separate receiving compartments, means for moving said material radially outwards towards the outer wall of said distribution casing, said moving means including a vane which passes next to a portion of each of said separation walls to move material directly into each of said compartments, a plurality of discharge conduits operatively connected to the base of said distribution casing and a source of air operatively connected to said discharge conduits for conveying said material.

2. The applicator according to claim 1 in which said auger assembly includes an auger casing, an auger shaft journalled for rotation within said casing and an auger flight surrounding said shaft and being rotatable therewith, said means on the upper end of said auger assembly for moving said material towards the outer wall of said casing including a plurality of radially extending material moving vanes secured to said shaft and rotating therewith.

3. The applicator according to claim 2 which includes an air manifold operatively connected to each of said discharge conduits, said manifold being substantially centered with respect to the rotational axis of said auger.

4. The applicator according to claim 3 which includes a venturi formed within said connection between said manifold and each of said discharge conduits.

5. The applicator according to claim 4 in which said distribution casing includes an upper, substantially horizontal plate, closing the upper end thereof, said auger shaft being bearingly supported centrally within said plate.

6. The applicator according to claim 4 in which said distribution casing includes a substantially vertical annular outer wall and an outwardly and downwardly extending annular inner wall extending from the upper end of said auger casing, said base of said distribution casing extending between the lower edges of said walls, said walls defining a material guiding chamber for each of said receiving compartments.

7. The applicator according to claim 3 in which said distribution casing includes an upper, substantially horizontal plate, closing the upper end thereof, said auger shaft being bearingly supported centrally within said plate.

8. The applicator according to claims 2 or 3 in which said distribution casing includes a substantially vertical annular outer wall and an outwardly and downwardly extending annular inner wall extending from the upper end of said auger casing, said base of said distribution casing extending between the lower edges of said walls, said walls defining a material guiding chamber for each of said receiving compartments.

9. The applicator according to claim 2 in which said distribution casing includes a support spider adjacent the upper end thereof and spanning said distribution casing, said auger shaft being bearingly supported centrally of said spider, and an inverted dishshaped shroud secured to and enclosing the upper side of said material moving vanes and rotatable therewith, to direct the material moved by said vanes, outwardly and downwardly into said discharge conduits.

10. The applicator according to claim 9 in which said shroud includes an annular, outwardly and downwardly curved flange being situated spaced inwardly from the inner surface of the wall of said distribution casing, said outwardly and downwardly curved flange and said inner wall of said discharge casing defining an annular venturi therebetween, and an air manifold operatively connected to the source of air and being operatively connected to the upper end of said distribution casing and communicating, through said venturi, to said discharge conduits, said material conveyed by said auger assembly being radially directed under said shroud and being deflected downwardly by said annular flange to be picked up by the air stream passing through said venturi.

11. The applicator according to claim 10 which includes a material moving assembly secured to the upper end of said auger shaft and rotatable therewith and being situated above said material moving vanes, and a source of granular material operatively connected to said material moving assembly, said material moving assembly distributing granular material radially outwardly towards the outer wall of said distributor casing to mix with material from said auger assembly.

12. The applicator according to claim 9 which includes a material moving assembly secured to the upper end of said auger shaft and rotatable therewith and being situated above said material moving vanes, and a source of granular material operatively connected to said material moving assembly, said material moving assembly distributing granular material radially outwardly towards the outer wall of said distributor casing to mix with material from said auger assembly.

13. The applicator according to claim 2 in which said distribution casing includes a support spider adjacent the upper end thereof and spanning said distribution casing, said auger shaft being bearingly supported centrally of said spider, and an inverted dishshaped shroud secured to and enclosing the upper side of said material moving vanes and rotatable therewith, to direct the material moved by said vanes, outwardly and downwardly into said discharge conduits.

14. The applicator according to claim 13 which includes a material moving assembly secured to the upper end of said auger shaft and rotatable therewith and being situated above said material moving vanes, and a source of granular material operatively connected to said material moving assembly, said material moving assembly distributing granular material radially outwardly towards the outer wall of said distributor casing to mix with material from said auger assembly.

15. The applicator according to claim 1 which includes an air manifold operatively connected to each of said discharge conduits, said manifold being substantially centered with respect to the rotational axis of said auger.

16. The applicator according to claim 15 which includes a venturi formed within said connection between said manifold, and each of said discharge conduits.

17. The applicator according to claim 16 wherein said venturi is situated externally of said distributor casing.

18. The applicator according to claim 16 in which a plurality of venturis are situated within the interior of said distributor casing, each venturi being situated vertically above one of said discharge conduits with the lower end of said venturi terminating spaced above said discharge conduits.

19. On an implement for spreading a substance substantially uniformly onto the ground, said implement having a bulk container for holding said substance, said container having a bottom, an apparatus for pneumatically distributing said substance comprising:

means for elevating a continuous first stream of said substance to a discharge end a height above the bottom of said bulk container, said elevating means including a lift member for providing positive upward displacement of said substance;

means for moving said substance within said bulk container to said elevating means;

means for distributing said substance flowing from the discharge end of said elevating means, said distributing means including means for separating said substance into a plurality of second streams, said distributing means including means for maintaining the continuous first stream until portions of the first stream are separated into the second streams;

a plurality of distribution tubes for directing said substance to output locations, said tubes being connected to said separating means to allow each of said tubes to receive one of said second streams of said substance; and means for supplying a stream of air to each of said second stream of said substance to move said substance through said distribution tubes to the output locations.

20. An apparatus in accordance with claim 19 wherein said elevating means includes a substantially vertical auger for rotation about an axis, said auger being substantially enclosed in a casing, said auger having a continuous flight as the lift member of said elevating means, said auger being operatively connected to a source of power, whereby said substance is elevated by said auger to a height above the bottom of said bulk container.

21. An apparatus in accordance with claim 20 wherein said auger has a shaft and said maintainins means includes a plurality of vanes spaced about said shaft above said casing at the discharge end of said elevating means, said vanes extending outwardly from said shaft and rotating with said shaft.

22. Apparatus in accordance with claim 17 wherein said distributing means includes a base extending away from the discharge end of said elevating means, said separating means including a plurality of evenly spaced apart openings in said base, said openings being in fluid communication with said distribution tubes, said separating means further including substantially vertical walls located between said openings and rising upwardly from said base.

23. Apparatus in accordance with claim 22 wherein said maintaining means includes radially extending blades extending outwardly from the discharge end of said elevating means, whereby the first stream moves continuously from said elevating means to one of said blades before being separated by said separating means into the second stream.

* * * * *